(12) United States Patent
Hashimoto et al.

(10) Patent No.: US 8,820,459 B2
(45) Date of Patent: Sep. 2, 2014

(54) ASSISTIVE POWER CONTROL APPARATUS FOR MOTOR-ASSISTED BICYCLE

(75) Inventors: Masayuki Hashimoto, Wako (JP);
Yoshihiro Namiki, Wako (JP);
Masahiro Kuroki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/424,943

(22) Filed: Mar. 20, 2012

(65) Prior Publication Data
US 2012/0247853 A1 Oct. 4, 2012

(30) Foreign Application Priority Data
Mar. 31, 2011 (JP) .................................. 2011-081333

(51) Int. Cl.
*B62M 6/55* (2010.01)
*B62M 6/45* (2010.01)

(52) U.S. Cl.
CPC .. *B62M 6/45* (2013.01); *B62M 6/55* (2013.01)
USPC ...................................................... 180/206.3

(58) Field of Classification Search
USPC ...................... 180/206.1, 206.2, 206.3, 206.4
See application file for complete search history.

(56) References Cited

U.S. PATENT DOCUMENTS

| 5,806,621 | A * | 9/1998 | Soda et al. ................. 180/206.4 |
| 2012/0083956 | A1* | 4/2012 | Aoki et al. ....................... 701/22 |
| 2013/0090819 | A1* | 4/2013 | Cheng .............................. 701/64 |

FOREIGN PATENT DOCUMENTS

| JP | 11-79062 A | | 3/1999 |
| JP | 11079062 A | * | 3/1999 |
| JP | 2002-264882 A | | 9/2002 |
| WO | 01/30643 A1 | | 5/2001 |

* cited by examiner

*Primary Examiner* — Joseph M Rocca
*Assistant Examiner* — Felicia L Brittman
(74) *Attorney, Agent, or Firm* — Westerman, Hattori, Daniels & Adrian, LLP

(57) ABSTRACT

An assistive power control apparatus for a motor-assisted bicycle controls a motor to generate an assistive torque depending on the pedaling force of a rider. The assistive power control apparatus detects a rotating torque value of a crankshaft rotated when a rider steps on pedals by a torque sensor, controls a motor to generate an assistive power determined using the rotating torque value, calculates a rotation angle of the crankshaft when a present rotating torque value is detected from a time period from a timing of detection of a peak position of the rotating torque value to a timing of detection of the rotating torque value, calculates a pedaling force applied when the rider steps on the pedals from the calculated rotation angle of the crankshaft and the detected present rotating torque value, and determines the assistive power of the motor according to the calculated pedaling force.

6 Claims, 7 Drawing Sheets

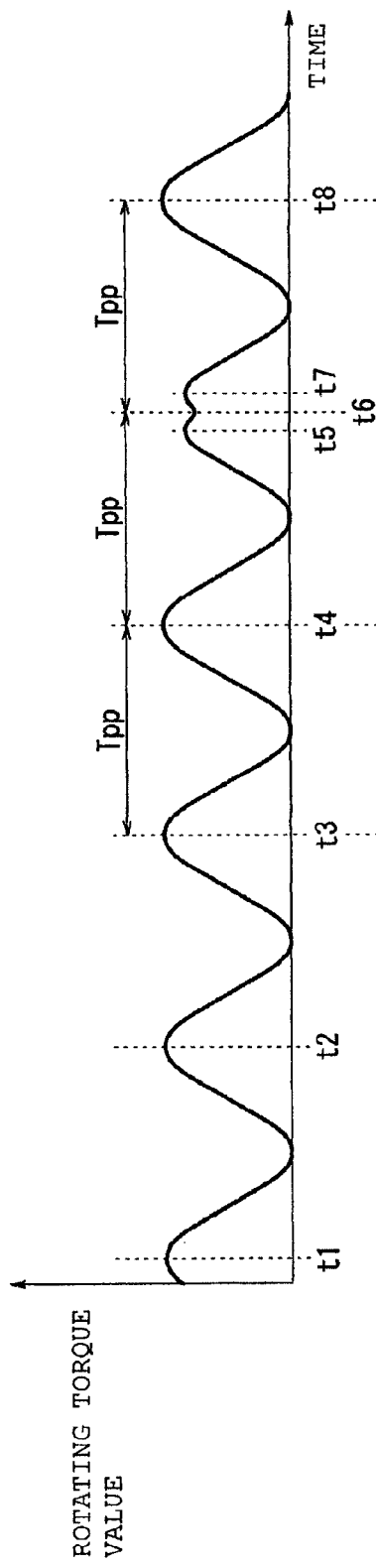
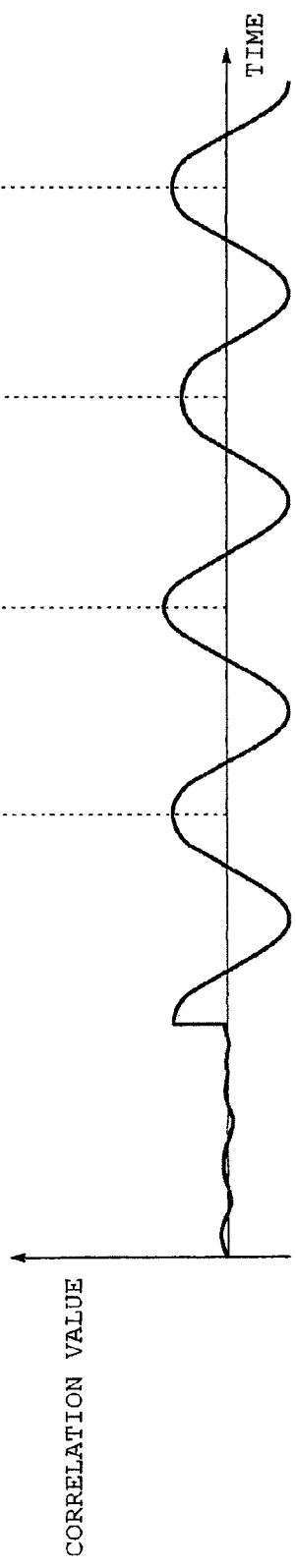
FIG. 7(a)
FIG. 7(b)

ASSISTIVE POWER CONTROL APPARATUS FOR MOTOR-ASSISTED BICYCLE

CROSS-REFERENCE TO RELATED APPLICATION

The present application claims the benefit of priority to Japanese Patent Application No. 2011-081333, filed on Mar. 31, 2011, the entire content of which is incorporated by reference.

TECHNICAL FIELD

The present invention relates to an assistive power control apparatus for a motor-assisted bicycle.

BACKGROUND OF THE INVENTION

It is conventionally known, as disclosed in Japanese Patent Laid-Open No. Hei 11-79062 below, that a value of rotating torque applied by the rider to a crankshaft provided with pedals of a bicycle is detected and that a motor is driven and controlled so as to generate an assistive torque depending on the rotating torque value.

SUMMARY OF THE INVENTION

However, the detected rotating torque value is a component in a direction of rotation of a pedaling force applied to the pedals by the rider. Therefore the motor is not driven and controlled so as to generate an assistive torque depending on the pedaling force.

An assistive power control apparatus for a motor-assisted bicycle is provided, which drives and controls a motor so as to generate an assistive torque depending on the pedaling force of the rider.

An assistive power control apparatus for a motor-assisted bicycle, which detects a rotating torque value of a crankshaft rotated when a rider steps on pedals by a torque sensor, and controls a motor so as to generate an assistive power determined using the rotating torque value, characterized in that the assistive power control apparatus calculates a rotation angle of the crankshaft when a present rotating torque value is detected from a time period from a timing of detection of a peak position of the rotating torque value to a timing of detection of the rotating torque value, calculates a pedaling force applied when the rider steps on the pedals in a vertical direction from the calculated rotation angle of the crankshaft and the detected present rotating torque value, and determines the assistive power of the motor according to the calculated pedaling force.

The assistive power control apparatus for the motor-assisted bicycle is further characterized in that a period between peak positions of the rotating torque value is set as a half cycle, an update is performed with the rotating torque value in a period of the previous half cycle as reference data, and a peak position of the rotating torque value is estimated from a correlation value obtained by normalized correlation of the rotating torque value detected in the present half cycle using the reference data.

The assistive power control apparatus for the motor-assisted bicycle is further characterized in that the assistive power of the motor is determined according to a vehicle speed of the motor-assisted bicycle and the pedaling force.

The assistive power control apparatus for a motor-assisted bicycle detects a rotating torque value of a crankshaft rotated when a rider steps on pedals by a torque sensor, controls a motor so as to generate an assistive power determined using the rotating torque value, and is characterized in that the assistive power control apparatus calculates a rotation angle of the crankshaft when a present rotating torque value is detected from a time period from a timing of detection of a peak position of the rotating torque value to a timing of detection of the rotating torque value, calculates a pedaling force applied when the rider steps on the pedals in a vertical direction from the calculated rotation angle of the crankshaft and the detected present rotating torque value, and determines the assistive power of the motor according to the calculated pedaling force. Thus, the pedaling force of the rider can be assisted linearly, and assistive control in line with the pedaling force of the rider can be performed.

The assistive power control apparatus for the motor-assisted bicycle is further characterized in that a period between peak positions of the rotating torque value is set as a half cycle, an update is performed with the rotating torque value in a period of the previous half cycle as reference data, and a peak position of the rotating torque value is estimated from a correlation value obtained by normalized correlation of the rotating torque value detected in the present half cycle using the reference data. Therefore, even when the rider steps on the pedals a plurality of times continually and thus a plurality of peak positions occur continually, a peak position is detected on the basis of the correlation value obtained by normalized correlation. It is thus possible to generate an appropriate assistive torque at each rotation angle of the crankshaft in each half cycle, and to perform assistive control that does not cause discomfort to the rider.

The assistive power of the motor is determined according to the vehicle speed of the motor-assisted bicycle and the pedaling force. Therefore assistive control can be performed at an assist ratio depending on the present vehicle speed.

BRIEF DESCRIPTION OF THE DRAWINGS

The advantages of the invention will become apparent in the following description taken in conjunction with the drawings, wherein

FIG. 7A is a timing diagram of a detected rotating torque value f, and FIG. 7B is a timing diagram of a correlation value γ obtained by normalized correlation using the rotating torque value f.

DETAILED DESCRIPTION OF THE INVENTION

An assistive power control apparatus for a motor-assisted bicycle according to a preferred embodiment of the present invention will be described in detail below with reference to the accompanying drawings.

Figure 1:
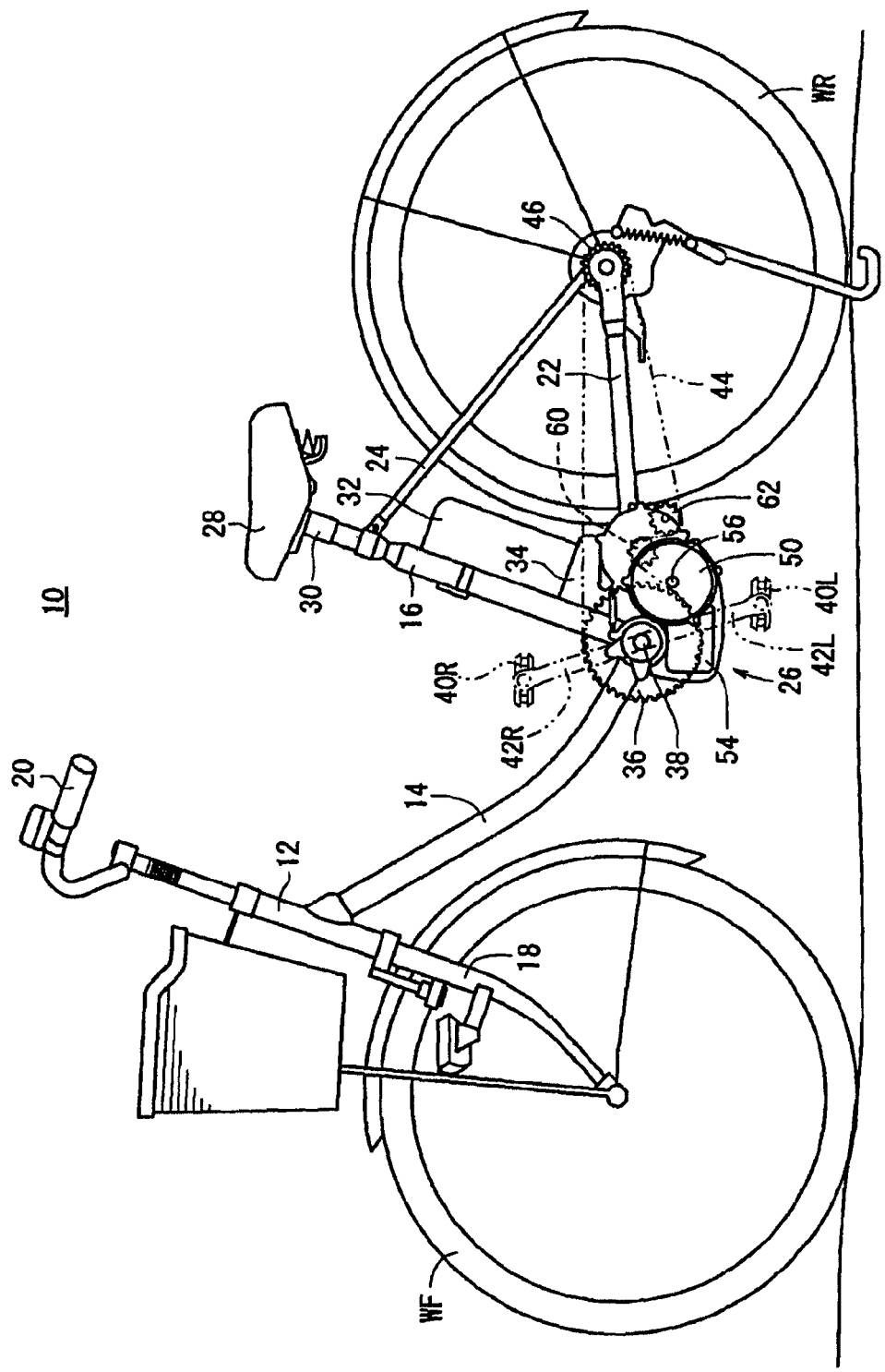
FIG. 1 is a left side view of a motor-assisted bicycle.
Figure 2:
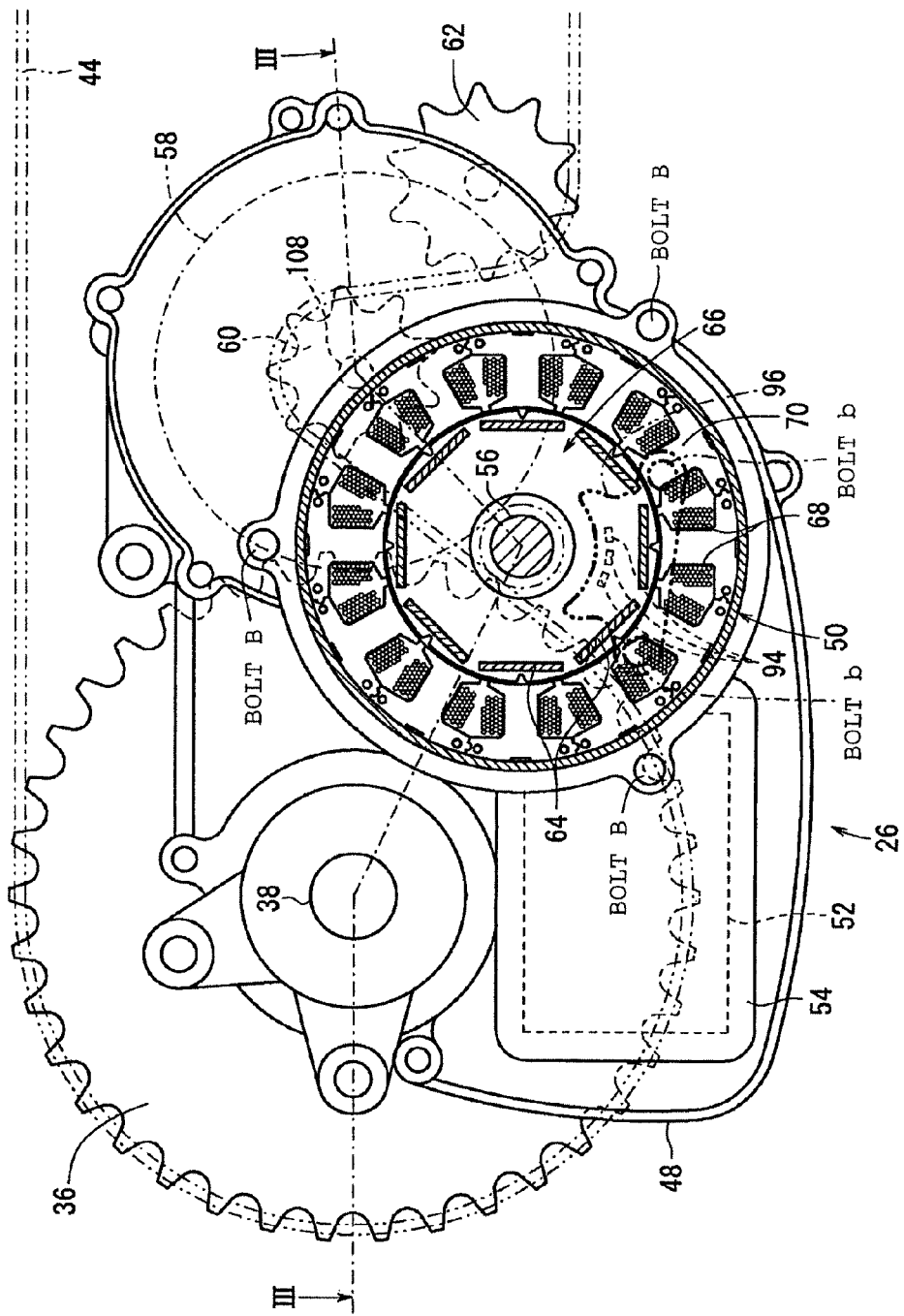
FIG. 2 is a left side view of principal parts of the assisted bicycle of FIG. 1.
Figure 3:
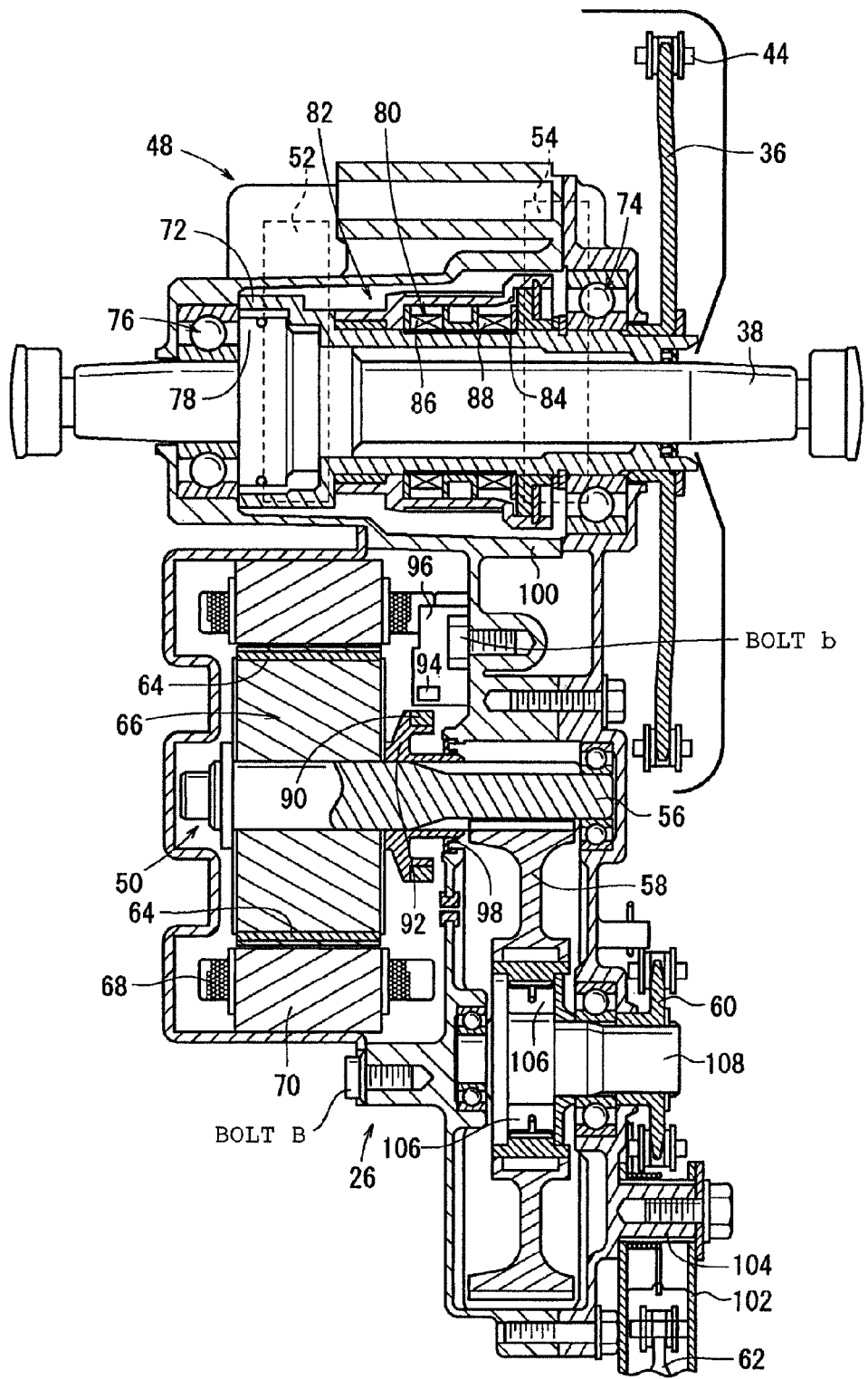
FIG. 3 is a sectional view taken along a line of FIG. 2.

FIG. 1 is a left side view of a motor-assisted bicycle (assisted bicycle) 10. FIG. 2 is a left side view of principal parts of the assisted bicycle 10 of FIG. 1. FIG. 3 is a sectional view taken along a line of FIG. 2.

The assisted bicycle 10 includes a head pipe 12 positioned in a front position of the bicycle body, a down frame 14 extending rearward and downward from the head pipe 12, and a seat pipe 16 extending upward from the rear end of the down frame 14. A front fork 18 extending downward is steerably connected to the head pipe 12. A front wheel WF is rotatably supported by the lower end of the front fork 18. A handlebar 20 is provided above the head pipe 12.

A rear fork 22 is disposed so as to extend rearward from the rear end of the down frame 14. A rear wheel WR is rotatably supported by the rear end of the rear fork 22. A pair of left and right stays 24 is disposed between the upper part of the seat pipe 16 and the rear part of the rear fork 22.

The down frame 14 and the rear fork 22 support an assist drive unit 26. A seat post 30 having a seat 28 at the upper end thereof is mounted to the seat pipe 16 so as to allow adjustment of the vertical position of the seat 28. At a rear position of the seat pipe 16, a battery 32 for supplying power to the assist drive unit 26 is attached to a stay 34 of the seat pipe 16 so as to be detachable.

A crankshaft 38 extends transversely across the bicycle body through the assist drive unit 26 and a sprocket (output unit) 36. A crank 42L having a pedal 40L and a crank 42R having a pedal 40R are connected to the respective opposite ends of the crankshaft 38. When the rider works the pedals 40L and 40R, a rotating torque (power) is applied to the crankshaft 38. The rotating torque applied to the crankshaft 38 rotates the sprocket 36. The rotation of the sprocket 36 is transmitted through a chain 44 to a sprocket 46 on the side of the rear wheel WR, thereby rotating the rear wheel WR. The sprocket 36, the chain 44, and the sprocket 46 function as a drive mechanism.

Figure 4:
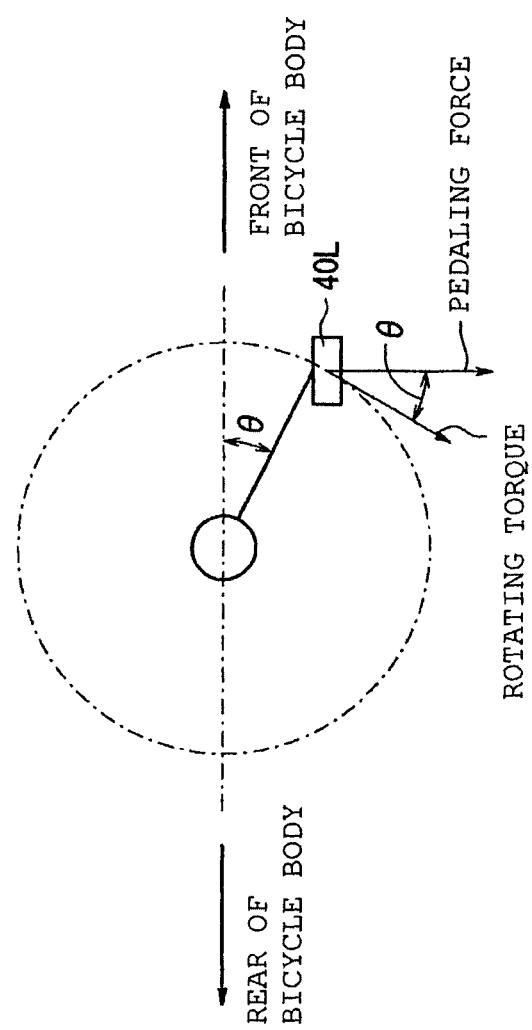
FIG. 4 is a diagram showing force relation between rotating torque applied to a crankshaft and pedaling force applied to pedals by the rider.

As shown in FIG. 4, a rotating torque value f applied to the crankshaft 38 is a component in the direction of the rotation of a pedaling force F when the rider works the pedal 40L, and is not the pedaling force F actually applied by the rider. The rotating torque value f and the pedaling force F can be expressed by a relational equation: rotating torque value f=pedaling force F×cos θ. When working the pedals 40L and 40R, the rider steps on the pedals 40L and 40R in a vertical direction. Therefore the direction of the pedaling force F is the vertical direction.

The assist drive unit 26 integrally indicates within its casing (case) 48: a brushless motor (motor) 50; a driver 52 for driving the brushless motor 50; a controller (assistive power control device) 54 for performing PWM control of the driver 52 on the basis of the rotating torque value f detected by a magnetostrictive type torque sensor (torque sensor) to be described later; a drive gear 58 rotating in mesh with a drive shaft 56 of the brushless motor 50; an output shaft 108 rotating according to the rotation of the drive gear 58; and an assist sprocket 60 rotating integrally with the output shaft 108. The chain 44 is attached to the assist sprocket 60. The assist drive unit 26 transmits the drive force of the brushless motor 50 to the drive mechanism.

The controller 54 calculates the force F with which the rider steps on the pedals 40L and 40R in the vertical direction (pedaling force applied to the pedals 40L and 40R) from the rotating torque value f detected by the magnetostrictive type torque sensor 80, and performs PWM control of the driver 52 (performs assist control) so that the brushless motor 50 generates an assistive torque (assistive power) determined by the pedaling force F and an assist ratio depending on the vehicle speed of the assisted bicycle 10. The vehicle speed of the assisted bicycle 10 can be obtained by a vehicle speed sensor, not shown in the drawings, which is provided to the front wheel WF, the rear wheel WR, or the like. Incidentally, the controller 54 also functions as a counter.

The driver 52 has switching elements in a plurality of phases (three phases as a U-phase, a V-phase, and a W-phase in the present embodiment). The controller 54 performs on-off control of the switching elements in the U-phase, the V-phase, and the W-phase at a predetermined duty ratio to perform PWM control of the driver 52. According to the PWM control, the driver 52 converts a direct current from the battery 32 into three-phase alternating-current power. The three-phase alternating currents are supplied to a stator coil in the U-phase, a stator coil in the V-phase, and a stator coil in the W-phase of the brushless motor 50. The drive shaft 56 of the brushless motor 50 is thereby rotated.

The assistive torque generated by the brushless motor 50 is transmitted to the output shaft 108 via the drive shaft 56 and the drive gear 58. The assistive torque transmitted to the output shaft 108 is then transmitted to the chain 44 via the assist sprocket 60. Thus, when the rider works the pedals 40L and 40R, the rotating torque value f (drive force) applied to the crankshaft 38 and the assistive torque generated by the brushless motor 50 are transmitted to the sprocket 46 on the side of the rear wheel via the chain 44, thereby rotating the rear wheel WR. Incidentally, an idler 62 for providing a large winding angle of the chain 44 is disposed at a rear portion of the assist sprocket 60.

The brushless motor 50 includes a rotor 66 having a total of eight permanent magnets 64 of N-poles and S-poles that are arranged alternately circumferentially and stators 70 having stator windings 68 in three phases, that is, the U-phase, the V-phase, and the W-phase for generating a rotating magnetic field for rotating the rotor 66. The stators 70 are arranged so as to cover the peripheral part of the rotor 66 and so as to be opposed to the rotor 66 in a radial direction. The drive shaft 56 is provided as the rotational shaft of the rotor 66. In addition, because the stators 70 have a total of 12 stator windings 68, there are four stator windings 68 in the U-phase, four stator windings 68 in the V-phase, and four stator windings 68 in the W-phase. The stator coil in the U-phase of the brushless motor 50 is formed by the four stator windings 68 in the U-phase. The stator coil in the V-phase is formed by the four stator windings 68 in the V-phase. The stator coil in the W-phase is formed by the four stator windings 68 in the W-phase.

The assist drive unit 26 has a mechanism for rotating the sprocket 36 when the rider works the pedals 40L and 40R in a direction to move the assisted bicycle 10 forward (normal direction) and for blocking the sprocket 36 from rotating when the rider works the pedals 40L and 40R in a direction opposite to the normal direction. Specifically, as shown in FIG. 3, the assist drive unit 26 has a hollow member (hollow torque transmitting member) 72 fitted over the periphery of the crankshaft 38, a bearing unit 74 disposed between the hollow member 72 and the casing 48, a bearing unit 76 disposed between the crankshaft 38 and the casing 48, and a one-way clutch 78 disposed between the crankshaft 38 and the hollow member 72. The one-way clutch 78 has a structure for transmitting the rotation of the crankshaft 38 to the hollow member 72 when the rider works the pedals 40L and 40R in the normal direction and for preventing the rotation of the crankshaft 38 from being transmitted to the hollow member 72 when the rider works the pedals 40L and 40R in the direction opposite to the normal direction. The right end of the hollow member 72 has splines, and the sprocket 36 fitted with the splines is mounted.

When the rider works the pedals 40L and 40R in the normal direction, the crankshaft 38 is rotated, causing the one-way clutch 78 to rotate the hollow member 72. The sprocket 36 is thereby rotated. When the rider works the pedals 40L and 40R in the direction opposite to the normal direction, the crankshaft 38 is rotated, but the hollow member 72 is prevented from being rotated by the one-way clutch 78. Therefore, when the rider works the pedals 40L and 40R in the direction opposite to the normal direction, the sprocket 36 is not rotated.

The magnetostrictive type torque sensor 80 for detecting the rotating torque value f applied to the crankshaft 38 is disposed over the crankshaft 38. Specifically, the magnetostrictive type torque sensor 80 is disposed on the periphery of the hollow member 72 by a supporting member 82. A magnetic film 84 is provided to the hollow member 72. The supporting member 82 supports the magnetostrictive type torque sensor 80 relatively rotatably with respect to the hollow member 72 such that the magnetostrictive type torque sensor 80 is opposed to the magnetic film 84. The magnetostrictive type torque sensor 80 includes two detecting coils 86 and 88. The magnetostrictive type torque sensor 80 converts a change in the inductance of the detecting coils 86 and 88, which is caused by magnetostriction generated when the hollow member 72 is rotated, into a voltage, and outputs the voltage to the controller 54. Incidentally, when the pedals 40L and 40R are being worked in the direction opposite to the normal direction, the hollow member 72 is not rotated, and therefore a rotating torque value f applied to the crankshaft 38 is not detected by the magnetostrictive type torque sensor 80. Incidentally, the magnetostrictive type torque sensor 80 detects a rotating torque value f in predetermined cycles (at intervals of Δt).

The drive shaft 56 of the brushless motor 50 is provided with a magnet holder 92 for retaining magnets 90. The magnet holder 92 rotates with the rotation of the rotor 66. Three hall ICs 94 for detecting the magnets 90 are disposed so as to be opposed to the magnets 90 (see FIG. 2). The three hall ICs 94 detect the rotation angle and rotation speed of the rotor 66. The hall ICs 94 are retained by a hall IC housing 96. The hall IC housing 96 is attached to the inside of the casing 48 of the assist drive unit 26 by a bolt b. Eight magnets 90 are provided circumferentially, and N-pole magnets 90 and S-pole magnets 90 are alternately arranged. The magnets 90 and the hall ICs 94 function as a magnetic pole sensor for detecting the rotation angle of the brushless motor 50.

The brushless motor 50 and the drive gear 58 are housed in respective spaces divided from each other. A dust seal 98 is provided to the periphery of the magnet holder 92. The dust seal 98 prevents the entry of dust and the like from the space housing the drive gear 58 into the space housing the brushless motor 50. A cover for protecting the brushless motor 50 is attached to the casing 48 of the assist drive unit 26 by a bolt B along the perimeter of the brushless motor 50.

The casing 48 has a partition plate 100 for dividing spaces within the casing 48. The driver 52, the controller 54, and the magnetostrictive type torque sensor 80 are disposed within a same space. The brushless motor 50 is housed and disposed in a space that is at a rear and lower portion than the crankshaft 38 and that is divided from the magnetostrictive type torque sensor 80. In addition, the driver 52 and the controller 54 are disposed below the magnetostrictive type torque sensor 80.

While the magnetostrictive type torque sensor 80 and the brushless motor 50 are housed in the respective spaces divided from each other, both are arranged in proximity to each other. Though not shown in the figures, the driver 52 and the controller 54 are fixed to wall surfaces of the casing 48, that is, fixed to the left wall surface and the right wall surface opposed to each other, respectively. The controller 54 is disposed on the wall surface of the casing 48 on the side of the magnetostrictive type torque sensor 80.

The idler 62 is rotatably supported by a supporting arm 102. A pivot 104 rotatably supports the supporting arm 102 such that the supporting arm 102 is rockable. The supporting arm 102 rotatably supported by the pivot 104 is biased by a torsion spring in a direction in which the idler 62 applies pressure to the chain 44.

A one-way clutch 106 is disposed between the output shaft 108 of the assist sprocket 60 and the drive gear 58. Only when the drive gear 58 is rotating in the normal direction (direction in which the assisted bicycle 10 moves forward), does the one-way clutch 106 transmit the rotation to the output shaft 108. Thus, only when the rotor 66 of the brushless motor 50 is rotating in the normal direction, the assist sprocket 60 is rotated, and the assistive torque generated by the brushless motor 50 is transmitted to the sprocket 46 on the side of the rear wheel WR via the chain 44.

Figure 5:
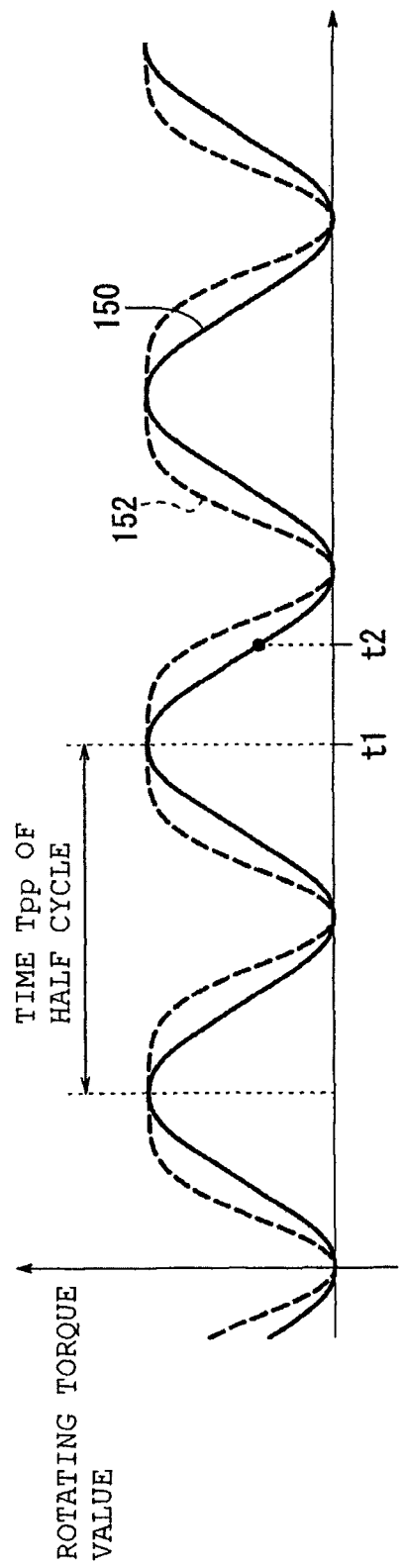
FIG. 5 is a timing diagram of a rotating torque value f detected by a magnetostrictive type torque sensor and a pedaling force F determined according to the detected rotating torque value f.

FIG. 5 is a timing diagram of the rotating torque value f detected by the magnetostrictive type torque sensor 80 and the pedaling force F determined according to the detected rotating torque value f. A reference numeral 150 in FIG. 5 denotes the rotating torque value f detected by the magnetostrictive type torque sensor 80. A reference numeral 152 denotes the pedaling force F calculated from the rotating torque value f. A peak value of the rotating torque arrives when the rotation angle θ of the crankshaft 38 shown in FIG. 4 becomes 0 degrees and 180 degrees. Thus, supposing that a period of working the pedals 40L and 40R for a 360-degree turn is one cycle, the peak value of the rotating torque value f arrives in each half cycle (each half turn of the pedals 40L and 40R). A time period between the peak positions, that is, the time of a half cycle is shown as Tpp. The peak value of the rotating torque value f arrives when the rotation angle θ of the crankshaft 38 shown in FIG. 4 becomes 0 degrees and 180 degrees. That is, the peak value f arrives when the angle θ formed between the cranks 42L and 42R and the longitudinal direction of the assisted bicycle 10 becomes 0 degrees and 180 degrees.

The controller 54 detects a peak position from the detected rotating torque value f. The controller 54 then calculates the rotation angle θ of the crankshaft 38 at a timing t2 from a time Tpp between previously detected peak positions of the rotating torque value f and a time between a timing t1 of the last detected peak position and the timing t2 of the last detected rotating torque value f. Specifically, the controller 54 calculates the rotation angle θ by using a relational equation: rotation angle θ=180 degrees×(t2−t1)/Tpp. The controller 54 then calculates the pedaling force F at the calculated rotation angle θ from the last detected rotating torque value f (rotating torque value f detected at the timing t2). Specifically, the controller 54 calculates the pedaling force F on the basis of a relational equation: pedaling force F=rotating torque value f/cos θ. The controller 54 then performs PWM control of the driver 52 so that the brushless motor 50 generates an assistive torque depending on the calculated pedaling force F.

The controller 54 thus calculates the pedaling force F with which the rider steps on the pedals 40L and 40R in the vertical direction from the detected rotating torque value f, and controls the driver 52. Therefore, the pedaling force of the rider can be assisted linearly, and assistive control in line with the pedaling force F of the rider can be performed.

However, when the rider actually works the pedals 40L and 40R, a waveform as shown in FIG. 5 such that the peak position of the rotating torque value f arrives in fixed cycles may not be obtained, but the waveform may be disturbed irregularly. In such a case, the peak position of the rotating torque value f cannot be estimated correctly, and the rotation angle θ of the crankshaft 38 cannot be obtained properly. The present embodiment estimates the peak position correctly with consideration further given to such a case. Incidentally, cases where the peak position of the rotating torque value f does not arrive in fixed cycles include a case where the rider reverses the pedals 40L and 40R by rotating the pedals 40L and 40R in the opposite direction without making a half turn of the pedals 40L and 40R, and then steps on the pedals 40L and 40R again.

The operation of the controller 54 will next be described with reference to a flowchart of FIG. 6. Incidentally, the controller 54 sequentially stores the rotating torque value f detected by the magnetostrictive type torque sensor 80 in a buffer memory (data storage unit), not shown in the figures, in the controller 54.

First, the controller 54 performs a process of detecting the peak position of the rotating torque value f on the basis of the rotating torque value f detected by the magnetostrictive type torque sensor 80 (step S1). The process of detecting the peak position of the rotating torque value f calculates Δf. Δf can be obtained by a relational equation: Δf=(rotating torque value f detected at present (detected this time)−rotating torque value f detected last time)/Δt.

Next, the controller 54 determines whether the peak position of the rotating torque value f is detected (step S2). Specifically, the controller 54 determines that the peak position is detected when Δf obtained this time is smaller than zero and Δf obtained last time is larger than zero. In this case, the timing in which the previous rotating torque value f was detected is the peak position.

When determining in step S2 that the peak position is not detected, the controller 54 directly proceeds to step S5. When determining in step S2 that the peak position is detected, the controller 54 determines whether a correlation value undetection flag is high (correlation value undetection flag is set) (step S3). The data storage unit has a flag storage area for storing the high (1) or low (0) of the correlation value undetection flag. The controller 54 determines whether the correlation value undetection flag is high on the basis of whether the high is stored in the flag storage area. Incidentally, a high (1) is initially stored as an initial value in the flag storage area. In addition, settings are made such that Tpp=0 and count value=0 are initial values.

When determining in step S3 that the correlation value undetection flag is low, the controller 54 directly proceeds to step S5. When determining in step S3 that the correlation value undetection flag is high, the controller 54 updates the memory of a reference data storage area of the data storage unit by replacing reference data g stored in the reference data storage area (step S4). The controller 54 then proceeds to step S5. The reference data is a set of a plurality of rotating torque values f detected between peak positions. The reference data to be replaced is a plurality of rotating torque values f detected between previous peak positions (between last peak positions). In this case, suppose that a period between peak positions is one cycle.

Proceeding to step S5, the controller 54 calculates a correlation value γ by performing normalized correlation of the rotating torque value f detected by the magnetostrictive type torque sensor 80 using the reference data stored in the reference data storage area of the data storage unit. Specifically, the controller 54 calculates the correlation value γ by using a relational equation indicated in Equation 1. f(t) denotes the rotating torque value detected at the timing t. γ(t) denotes a correlation value obtained from the rotating torque value f at the timing t. g(t) denotes a rotating torque value f(t) as reference data detected at the timing t. Incidentally, when there is no reference data g, the calculated correlation value γ is zero.

$$\gamma(t) = \frac{\sum_{\tau}^{T}(f(t-\tau)-\overline{f}) \times (g(\tau)-\overline{g})}{\sqrt{\sum(f(t-\tau)-\overline{f})^2} \times \sqrt{\sum(g(\tau)-\overline{g})^2}} \quad \text{[Equation 1]}$$

Next, the controller 54 performs a process of detecting the peak position of the correlation value γ on the basis of the calculated correlation value γ (step S6). The process of detecting the peak position of the correlation value γ calculates Δγ. Δγ can be obtained by a relational equation: Δγ=(present correlation value γ(calculated this time)−correlation value γ calculated last time)/Δt.

Next, the controller 54 determines whether the peak position of the correlation value γ is detected (step S7). Specifically, the controller 54 determines that the peak position is detected when Δγ obtained this time is smaller than zero, Δγ obtained last time is larger than zero, and the correlation value γ calculated last time is larger than a predetermined value (for example 0.65). When it is determined that the peak position is detected, the timing of calculation of the previous correlation value γ is the peak position. The peak position of the correlation value γ is estimated to be the peak position of the rotating torque value f. This correlation value γ does not exceed one. This correlation value γ(t) indicates a degree of similarity between the reference data g (rotating torque value f in the previous cycle) and the rotating torque value f at a timing t. A correlation value γ of one represents a highest degree of similarity (perfect matching). The lower the correlation value γ is, the lower the degree of similarity becomes.

When determining in step S7 that the peak position of the correlation value γ is not detected, the controller 54 determines whether a present count value c is larger than zero (step S8). When determining in step S8 that the count value c is not larger than zero, the controller 54 returns to step S1. When determining in step S8 that the count value c is larger than zero, the controller 54 increments the count value c (step S9). That is, the controller 54 sets as follows: count value c=count value c+1.

Next, the controller 54 determines whether the count value c is larger than a threshold value α (step S10). When determining in step S10 that the count value c is not larger than the threshold value α, the controller 54 proceeds to step S16. When determining in step S10 that the count value c is larger than the threshold value α, the controller 54 sets the correlation value undetection flag high (step S11). Next, the controller 54 sets the count value c to zero, and sets the time Tpp of a half cycle to zero (step S12). The controller 54 then proceeds to step S16.

When determining in step S7 that the peak position of the correlation value γ is detected, on the other hand, the controller 54 next sets the correlation value undetection flag low. Specifically, the controller 54 stores a low (0) in the flag storage area (step S13).

Next, the controller 54 updates the memory of the reference data storage area by replacing the reference data g stored in the reference data storage area of the data storage unit (step S14). In step S14, the controller 54 stores rotating torque values f detected between peak positions of the correlation value γ (between the last detected peak positions of the rotating torque value f) as reference data g.

Next, the controller 54 sets the time Tpp between peak positions (a half cycle) to the present count value c, and sets the count value c to one (step S15). The controller 54 then proceeds to step S16.

Proceeding to step S16, the controller 54 determines whether the correlation value undetection flag is low and the Tpp is larger than zero. When determining in step S16 that the correlation value undetection flag is not low or that the Tpp is not larger than zero, the controller 54 returns to step S1.

When determining in step S16 that the correlation value undetection flag is low and that the Tpp is larger than zero, on the other hand, the controller 54 proceeds to step S17, where the controller 54 calculates the present rotation angle θ of the crankshaft 38. Specifically, the controller 54 calculates the present rotation angle θ of the crankshaft 38 (rotation angle of the crankshaft 38 at the rotating torque value f detected this time) from the time Tpp of the previous (last) half cycle and the present count value c. Provided that the last detected peak position of the correlation value γ is t1, and that the timing of detection of the rotating torque value f detected this time is t2 (see FIG. 5), the rotation angle θ of the crankshaft 38 can be obtained from a relational equation: θ=180 degrees×(t2−t1)/Tpp. In this case, (t2−t1) is the present count value c.

Next, the controller 54 estimates the pedaling force F from the rotating torque value f detected this time and the rotation angle θ of the crankshaft 38 (step S18). The pedaling force F can be obtained by a relational equation: pedaling force F=rotating torque value f/cos θ.

Next, the controller 54 drives the brushless motor 50 by performing PWM control of the driver 52 so that the brushless motor 50 generates an assistive torque determined by the obtained pedaling force F and the assist ratio depending on the present vehicle speed of the assisted bicycle 10 (step S19).

FIG. 7A is a timing diagram of the detected rotating torque value f. FIG. 7B is a timing diagram of the correlation value γ resulting from normalized correlation using the rotating torque value f. Incidentally, the count value c shall not become larger than the threshold value α in the timing diagrams of FIGS. 7A and 7B.

According to the above-described operations, a peak value of the rotating torque value f is first detected at the timing t1. However, because rotating torque values f substituted as reference data g in step S4 are rotating torque values detected in a part of a period between peak positions, the correlation value γ calculated in step S5 is a low value. Thus, the peak position of the correlation value γ is not detected in step S7.

When the timing t2 thereafter arrives, the rotating torque values f detected between the timing t1 and the timing t2 are substituted as reference data g in step S4, and the correlation value γ is calculated.

When the timing t3 arrives, the timing t3 is detected as the peak position of the correlation value γ in step S7, and the rotating torque values f detected between the timing t2 and the timing t3 are substituted as reference data g in step S14. Then, in step S15, the present count value c is set as the time Tpp between peak positions (a half cycle), and the count value is set to one. In the timing t3, the count value c is zero, and thus Tpp=0. Next, a result of determination in step S16 is No, and the process returns to step S1. Incidentally, at this time, because Tpp is zero, a correct rotation angle θ of the crankshaft 38 cannot be calculated. Therefore, the driving and control of the brushless motor 50 does not need to be performed when Tpp=0. That is, the operations from step S17 to step S19 does not need to be performed when Tpp=0.

When the timing t4 arrives, the timing t4 is detected as the peak position of the correlation value γ in step S7, and the rotating torque values f detected between the timing t3 and the timing t4 are substituted as reference data g in step S14. Then, in step S15, the present count value c is set as the time Tpp between peak positions (a half cycle), and the count value is set to one. Thereafter, the rotation angle θ of the crankshaft 38 and the pedaling force F are calculated in order in steps S17 to S19, and the brushless motor 50 is driven to generate an assistive torque.

Thereafter, the count value c is incremented in step S9 until the timing t6 as a next peak position of the correlation value γ arrives. In step S17, the rotation angle θ depending on the present count value c is calculated using the Tpp.

In this case, the peak position of the rotating torque value f is detected in the timing t5 and the timing t7 before and after the timing t6. However, because the peak position is detected on the basis of the correlation value γ, even when the rider steps on the pedals 40L and 40R a plurality of times continually and thus a plurality of peak positions occur continually, it is possible to calculate the rotation angle θ of the crankshaft 38 properly, generate an appropriate assistive torque, and perform assistive control that does not cause discomfort to the rider.

When the timing t5 and the timing t7 are regarded as peak positions, on the other hand, a period from the timing t4 to the timing t5, a period from the timing t5 to the timing t6, and a period from the timing t6 to the timing t7 are regarded as periods in which the pedals 40L and 40R made a half turn. It is therefore not possible to properly calculate the rotation angle θ of the crankshaft 38 in the period from the timing t4 to the timing t5, the period from the timing t5 to the timing t6, and the period from the timing t6 to the timing t7.

Thus, when the correlation value γ is obtained and the peak position of the correlation value γ is estimated to be the peak position of the rotating torque value f, assistive control that does not cause discomfort to the rider can be performed.

Figure 6:
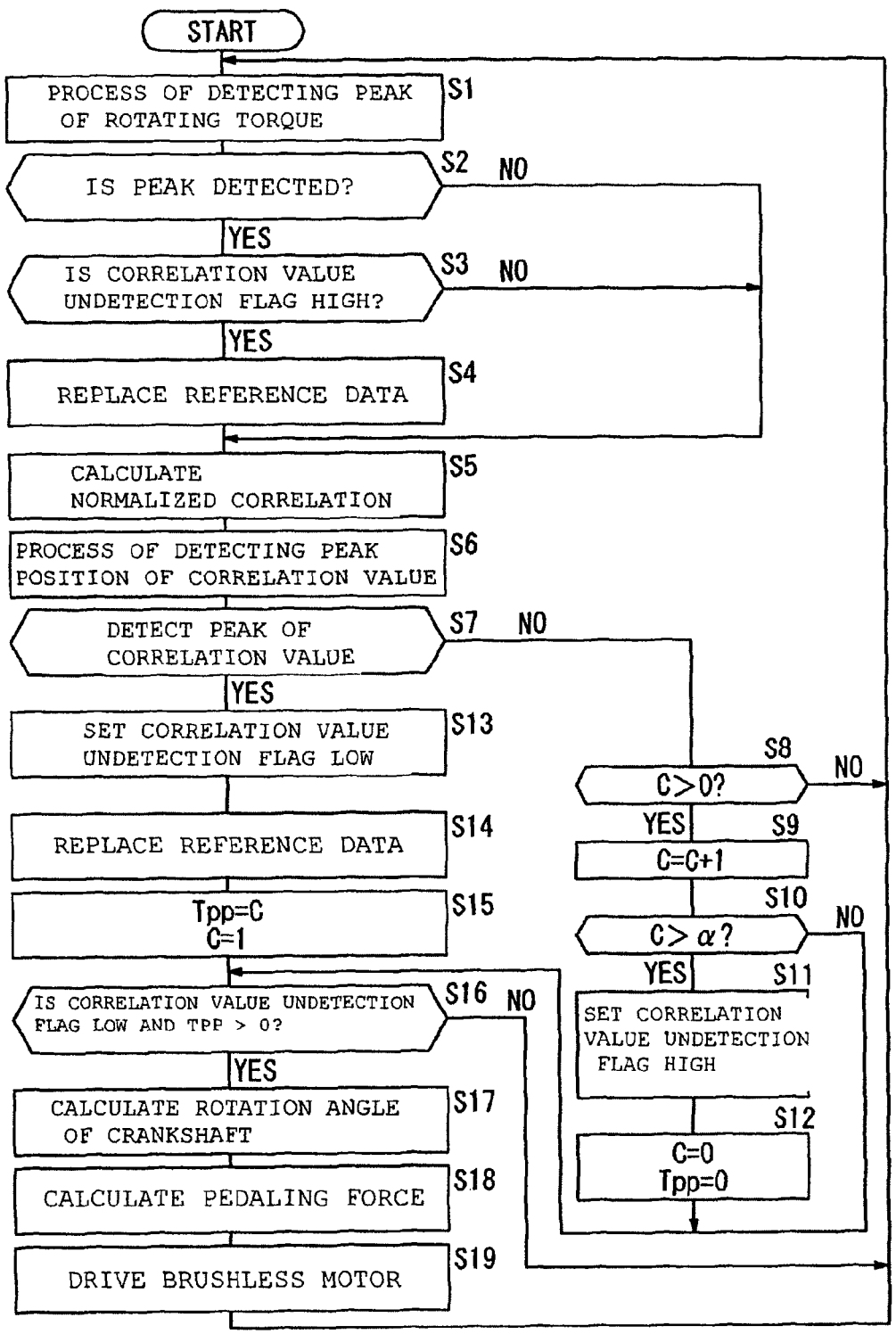
FIG. 6 is a flowchart showing operations of a controller.

Incidentally, in the flowchart of FIG. 6, when it is determined in step S10 that the count value c is larger than the threshold value α, the correlation value undetection flag is set high (step S11), the count value c is set to zero, and the time Tpp of a half cycle is set to zero (step S12). This is to determine that an abnormality has occurred and perform the operations shown in FIG. 6 from the beginning by initialization when the peak position of the correlation value γ is not detected even after a predetermined time. A provision can thus be made for an abnormal state.

The preferred embodiments of the present invention have been described above. The technical scope of the present invention, however, is not limited to the scope described in the foregoing embodiments. It is obvious to those skilled in the art that various changes and improvements may be made to the embodiments. It is apparent from the description of claims that forms resulting from such changes and improvements are covered by the technical scope of the present invention. The reference symbols in parentheses referred to in the claims are given in accord with the reference symbols in the accompanying drawings for an easy understanding of the present invention, and the present invention should not be construed as being limited to the elements denoted by those reference symbols.

We claim:
1. A motor-assisted bicycle, comprising:
   a crankshaft which is rotated when a rider steps on pedals connected to said crankshaft;
   a torque sensor;
   a motor;
   an assistive power controller; and a vehicle speed sensor provided to a front or rear wheel of the motor-assisted bicycle which determines a vehicle speed of the motor-assisted bicycle, wherein said assistive power controller detects a rotating torque value of said crankshaft by said torque sensor, wherein said assistive power controller calculates a rotation angle of said crankshaft since detection of a peak position of said rotating torque value, wherein said assistive power controller calculates a pedaling force applied when the rider steps on said pedals in a vertical direction, based on said calculated rotation angle of said crankshaft and presently detected rotating torque value, wherein said assistive power controller determines assistive power to be output by said motor according to said calculated pedaling force, wherein said assistive power controller controls said motor so as to generate the assistive power, and wherein the assistive power of said motor is determined according to the vehicle speed of said motor-assisted bicycle and said pedaling force.

2. The motor-assisted bicycle according to claim 1, wherein a period between peak positions of said rotating torque value is a half cycle, wherein said rotating torque value is updated with the period of the previous half cycle as reference data, and wherein a peak position of said rotating torque value is estimated from a correlation value obtained by a normalized correlation of said rotating torque value detected in the present half cycle using said reference data.

3. An assistive power control apparatus for a motor-assisted bicycle having a crankshaft which is rotated when a rider steps on pedals connected to said crankshaft, a torque sensor and motor, the assistive power control apparatus comprising:

an assistive power controller, wherein said assistive power controller detects a rotating torque value of said crankshaft by said torque sensor, wherein said assistive power controller calculates a rotation angle of said crankshaft since detection of a peak position of said rotating torque value, wherein said assistive power controller calculates a pedaling force applied when the rider steps on said pedals in a vertical direction, based on said calculated rotation angle of said crankshaft and presently detected rotating torque value, wherein said assistive power controller determines assistive power to be output by said motor according to said calculated pedaling force, wherein said assistive power controller controls said motor so as to generate the assistive power, wherein the motor-assisted bicycle further comprises a vehicle speed sensor provided to a front or rear wheel of the motor-assisted bicycle which determines a vehicle speed of the motor-assisted bicycle, and wherein the assistive power of said motor is determined according to the vehicle speed of said motor-assisted bicycle and said pedaling force.

4. The assistive power control apparatus according to claim 3, wherein a period between peak positions of said rotating torque value is a half cycle, wherein said rotating torque value is updated with the period of the previous half cycle as reference data, and wherein a peak position of said rotating torque value is estimated from a correlation value obtained by a normalized correlation of said rotating torque value detected in the present half cycle using said reference data.

5. A method of generating assistive power for a motor-assisted bicycle, having a crankshaft which is rotated when a rider steps on pedals connected to said crankshaft, a torque sensor and motor, comprising:

detecting a rotating torque value of said crankshaft rotated when the rider steps on said pedals of the motor-assisted bicycle using said torque sensor, calculating a rotation angle of said crankshaft since detection of a peak position of said rotating torque value, calculating a pedaling force applied when the rider steps on said pedals in a vertical direction, based on said calculated rotation angle of said crankshaft and presently detected rotating torque value, determining an assistive power to be output by a motor according to said calculated pedaling force, controlling said motor so as to generate the assistive power, wherein the motor-assisted bicycle further comprises a vehicle speed sensor provided to a front or rear wheel of the motor-assisted bicycle which determines a vehicle speed of the motor-assisted bicycle, and wherein the assistive power of said motor is determined according to the vehicle speed of said motor-assisted bicycle and said pedaling force.

6. The method according to claim 5, wherein a period between peak positions of said rotating torque value is a half cycle, wherein said rotating torque value is updated with the period of the previous half cycle as reference data, and wherein a peak position of said rotating torque value is estimated from a correlation value obtained by a normalized correlation of said rotating torque value detected in the present half cycle using said reference data.

* * * * *